H. B. Brown,
Reading Block.
Nº 27,201.  Patented Feb. 21, 1860.
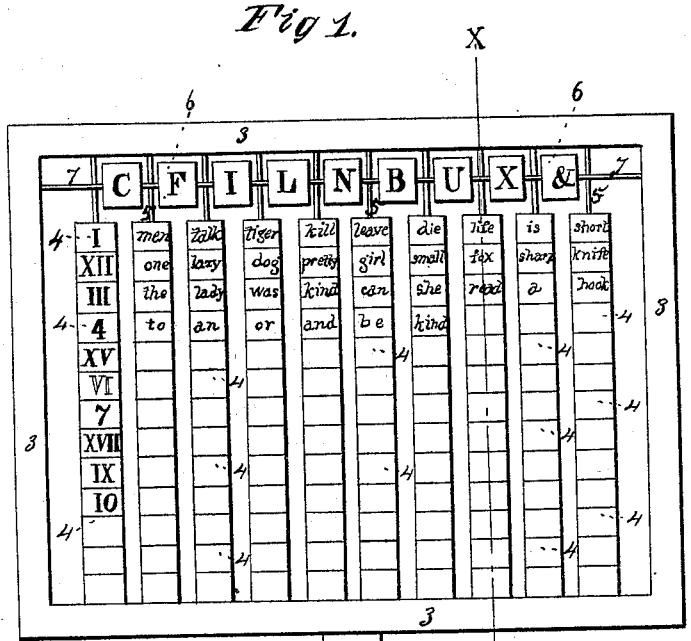
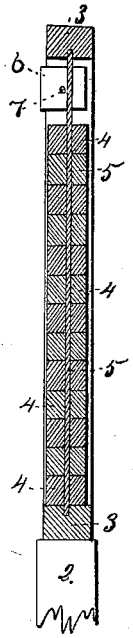
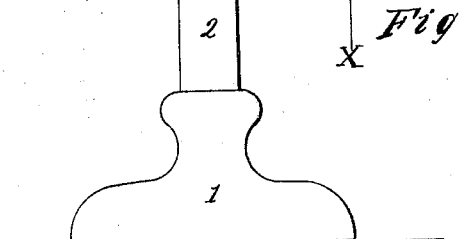
Witnesses.
Hiram L. Lewis
Wm. W. Wood
Inventor.
Hugh B. Brown

UNITED STATES PATENT OFFICE.

HUGH B. BROWN, OF HUNTINGTON, NEW YORK.

APPARATUS FOR TEACHING ORTHOGRAPHY, &c.

Specification of Letters Patent No. 27,201, dated February 21, 1860.

*To all whom it may concern:*

Be it known that I, HUGH B. BROWN, of Huntington, in the county of Suffolk and State of New York, have invented an Improvement in Apparatus for Teaching Orthography and other Composition, the construction and operation of which I have described in the following specification and illustrated in its accompanying drawings with sufficient clearness to enable competent and skilful workmen in the arts to which it pertains or is most nearly allied to make and use my invention.

My said invention consists in the arrangement as hereinafter described of blocks, upon which letters or figures or words are printed or otherwise represented, upon axes in a frame as shown, the arrangement being such that by turning the blocks upon their axes, so as to present different faces other words, or letters or figures will be shown, so that by changing the position of these blocks by rotation various words and sentences may be expressed, as hereinafter more fully set forth.

In the accompanying drawings: Figure 1 is a side elevation of my apparatus. Fig. 2 is a vertical section showing the parts at the left hand of the line X X, as drawn across Fig. 1, the lower part of the standard being broken off, and the pedestal omitted. Figs. 3 and 4 are isometrical views of one of the blocks.

1 is a pedestal by which the frame is supported by means of the standard 2.

3 is the frame in which the blocks 4 are secured upon axes 5, 5. Other blocks 6 are secured upon a horizontal axis 7. The axes upon which the blocks revolve may be properly made of wire. The upper row of blocks is intended to teach orthography, and is marked with single letters of the alphabet. This row may be also used to teach the alphabet itself to small children. These blocks, and also the blocks 4 are so fitted to their axes as to be capable of being turned upon them, but still having sufficient friction to keep them in the position in which they are placed. The blocks 4 are intended to teach exercises in composition or in reading, and with the exception of one vertical row, have words printed upon three sides of them as represented. One of the end rows is provided with figures, marks of punctuation, &c., to enable the operator to make the composition complete in all respects.

It is well known that the mind learns the most readily when the hands are engaged in seconding its exertions in acquiring knowledge. For the purpose of leading the young mind in its endeavors to acquire a knowledge of composition, words or letters are arranged on three sides of these blocks in such a manner as to form a large number of simple sentences by their transpositions into various positions.

In using this instrument, the blocks are first turned into such a position as to show the sides which are blank; in the composition of sentences the first block which has the word upon it which is desired to commence with is first turned into position to show this; if the next block has upon it the next word required, that is turned into position also, but if it has not, it is left with its blank side exposed, the operator passing without change of position such blocks as do not contain the word or letter desired. The blanks do not count.

This device furnishes the means of exercising a class without the use of a black board, and with less trouble. It also enables the teacher to place short lessons before the class, to be studied.

This invention may perhaps be made more complete by attaching symbols or pictures of the articles named to the same frame as that in which the printed blocks are hung, in such a manner as to enable the operator to express the idea not only by proper language but also by symbolic representation. To do this it may be necessary to enlarge the frame, or another frame may be connected with it for that purpose. In either case the smybol of an object and the name of the same object would be upon separate blocks, and operated independently of each other. In this way, the mind of the child may be trained in a knowledge of the appearance of an object, and the name by which it is called at one and the same time.

Having fully described my said invention, I claim—

The arrangement upon axes in a frame as described, of a series of blocks with printed or otherwise marked, and with blank sides, substantially as and for the purposes set forth.

H. B. BROWN.

Witnesses:
JOHN CRUMLY,
THOS. P. HOW.